Sept. 1, 1959  B. J. KERLEY, JR  2,902,342
METHOD AND APPARATUS FOR PRODUCING AMMONIUM SALTS
Filed Jan. 27, 1955
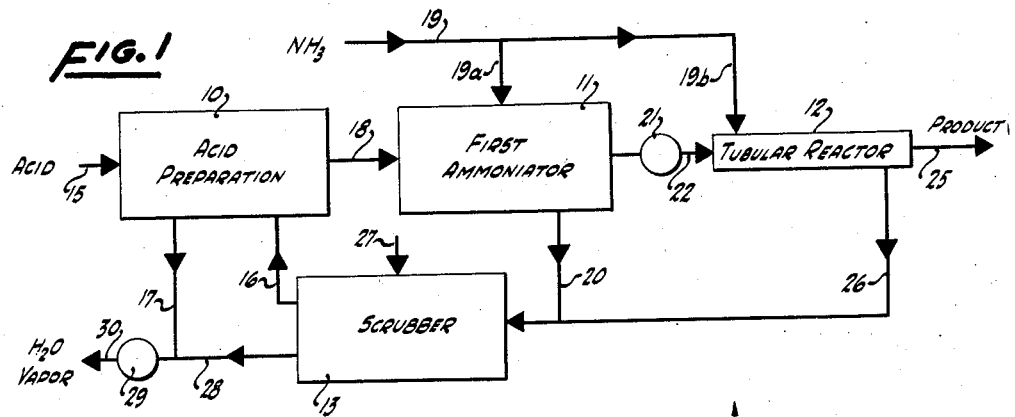
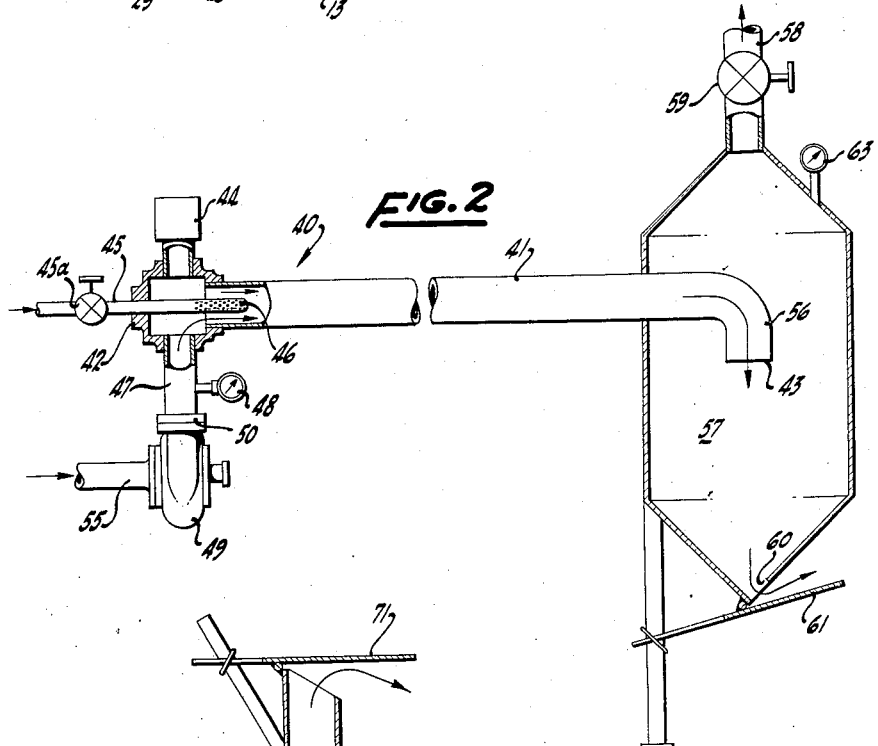
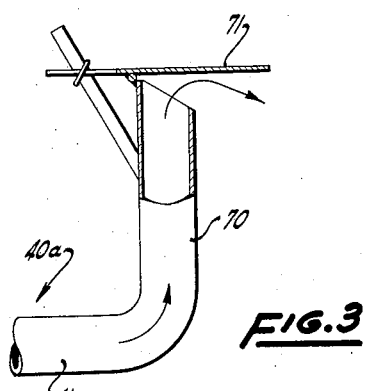
INVENTOR.
BERNARD J. KERLEY, JR.
BY Edward B. Fugg
ATTORNEY United States Patent Office 2,902,342
Patented Sept. 1, 1959

2,902,342

METHOD AND APPARATUS FOR PRODUCING AMMONIUM SALTS

Bernard J. Kerley, Jr., Imperial, Calif.

Application January 27, 1955, Serial No. 484,336

5 Claims. (Cl. 23—107)

This invention relates to a method and to apparatus for producing solid ammonium compounds and mixtures thereof, particularly ammonium salts of sulphuric, phosphoric and nitric acid which are useful as fertilizers.

In prior methods of producing ammonium phosphate, ammonium sulphate, ammonium nitrate and mixtures thereof, gaseous ammonia or aqueous ammonia solution is reacted with the corresponding acid or mixture of acids and the ammonium salt or salts are deposited from the solution in solid form. The solid salts are separated by any suitable means such as centrifuging, filtration or decantation, and the separated solids are dried and otherwise treated to produce the finished product. The mother liquor is recycled to the system for further concentration.

Such method and apparatus employed therewith are disadvantageous, among other reasons because of the necessity of handling the mother liquor, separating it from the desired solid products and returning it to the system.

It is an object of the present invention to provide apparatus and method of producing ammonium salts having fertilizer value by reaction of ammonia with appropriate acids, and by converting the reaction mixture directly into solids without the production of a mother liquor.

This and other objects of the invention will be apparent from the ensuing description and the appended claims.

In accordance with the present invention, ammonia in liquid or gaseous form is added to and mixed with the acid or acids whose ammonium salt or salts are desired. The ammonia and the acid or acids are preferably employed in approximately stoichiometric proportions to form the desired salt or salts and to produce a neutral product. The water present in the reaction mixture is calculated to be such that the heat of reaction will evaporate substantially all the water. The reaction mixture is then passed at high velocity through a confined passageway such as a tubular reaction chamber or converter. Steam produced by vaporization of the water will assist in propelling the solid reaction product through the passageway. The steam or vapor is then separated from the solid reaction product.

My invention preferably is carried out in three separate steps. The first of these steps is the preparation of the acid solution; the second step is the partial ammoniation of the acid solution prepared in the first step; and the third step is the complete or final ammoniation of the partly ammoniated acid solution produced in the second step, such complete or final ammoniation being carried out in a tubular converter at high linear velocity to expel a mixture of dry or nearly dry reaction product and water vapor or steam.

The acid may be prepared (i.e., the first step of my preferred process may be carried out) in any of the various ways, for example, the following:

Example I.—Acid preparation for producing mixing grade ammonium sulphate. — Sulphuric acid of commercial grade is dissolved in water to produce 38 to 48 degree Baumé solution equivalent to 45 to 60% sulphuric acid.

Example II.—Acid preparation for producing high analysis fertilizer mixture containing ammonium sulphate and ammonium phosphate.—A dilute phosphoric acid solution is produced by leaching phosphate rock with an aqueous solution of sulphuric acid. Then concentrated sulphuric acid is added to bring the total acid up to about 45 to 65% sulphuric acid equivalent as determined by titration with methyl orange as indicator.

Example III.—Acid preparation for producing a low analysis mixture of ammonium phosphate and ammonium sulphate.—This procedure is advantageous where phosphoric acid is not available or where facilities for producing dilute phosphoric acid as in Example II above, are not available. It is suitable for the preparation of a low analysis fertilizer containing a total plant food not exceeding about 22% (combined nitrogen and $P_2O_5$). In this method phosphate rock is added to an aqueous sulphuric acid solution (38 to 48° Bé.) to produce an aqueous solution of phosphoric acid containing calcium sulphate suspended in the solution.

In the second step of the preferred process of my invention, liquid or gaseous ammonia and acid solution which has been prepared in accordance with step No. 1 (Examples I, II and III above) are supplied continuously and simultaneously into an ammoniating chamber, preferably a chamber about 3 to 6 feet deep and having a horizontal floor with an area of about 20 square feet per ton of final product produced per hour. The ammonia is preferably introduced through perforated tubes at or near the bottom of the ammoniating chamber. The ammonia and acid are supplied at such a rate as to maintain a specific gravity of 38 to 48° Bé. and an acid concentration of about 18 to 36% calculated as sulphuric acid equivalent. Water evaporates due to heat of reaction and is carried off through a duct. The process is continued, ammonia being supplied to the acid solution until apparent ammonia losses are detected or until solid formation begins to hamper operation.

Preferably this second step is carried out in such manner as to maintain a gravity between 40 and 42° Bé. and an acid concentration of 20 to 25% calculated as sulphuric acid.

Steps Nos. 1 and 2 described above may be combined. However, separation of the two steps is preferable because it permits better control.

In step No. 3, the hot slurry produced in step No. 2 is pumped at a controlled rate into a tubular reactor into which liquid ammonia is also introduced at a rate calculated to yield an approximately neutral product. The tubular reactor is of a length and diameter sufficient for the throughput of product, the length being sufficient that the reaction is substantially complete and that the heat of reaction has evaporated substantially all of the water by the time the mixture is expelled from the outlet end of the tube. Usually about 15 seconds of residence time in the tube is sufficient. Fast movement of the mixture through the tube is advantageous because it prevents plugging.

The second (partial ammoniation) and third (final ammoniation) steps may be combined and carried out as a single step in the tubular reactor. However, it is advantageous to carry out partial ammoniation, to the point of producing a saturated solution without producing a large solids load, in more ordinary types of equipment, and to complete the ammoniation in the special tubular reactor of my invention.

Referring now to Figure 1, a complete system is there shown diagrammatically for producing mixing grade ammonium sulphate in accordance with the present invention. Similar apparatus and a similar method are applicable to the production of ammonium sulphate-ammonium phosphate mixtures and ammonium nitrate.

Referring to Figure 1, an acid preparation tank is shown at 10, a first ammoniation reactor at 11, a second ammoniation reactor at 12 and a scrubber at 13. Sulphuric acid of suitable strength, e.g., 38 to 66° Bé., is introduced into the acid preparation tank 10 through a line 15. Suitable mixing apparatus (not shown) is employed to mix the acid with water which is introduced through a line 16. The water and acid are mixed in proportions to produce a 38 to 48° Bé. solution. The heat of solution produces some water vapor which is taken off through a line 17. The acid solution is taken through a line 18 to the first reactor 11 into which anhydrous liquid ammonia is introduced through lines 19 and 19a. As stated above, the first reactor or ammoniator 11 preferably has a flat floor with an area of approximately 20 square feet per ton of product produced per hour, and the ammonia is preferably bubbled into the acid solution through suitable apparatus (not shown) installed on or near the floor of the reactor. The acid solution and ammonia are introduced in proportions to maintain a specific gravity of 38 to 48° Bé. and a free acid content of 18 to 36% sulphuric acid equivalent. This process is continued until the water vapor which leaves through a line 20 contains an appreciable amount of ammonia, or until the solids formation interferes with efficient mixing of the ammonia and the acid solution.

A slurry is thus produced which is pumped out by a pump 21 through a line 22 into the tubular reactor 12. Liquid anhydrous ammonia is introduced simultaneously into the tubular reactor 12 through the line 19b. The slurry introduced through line 22 and the ammonia introduced through line 19b are supplied in approximately stoichiometric proportions. The resulting mixture passes through the elongated tube 12 and must, of necessity, pass from left to right as viewed in Figure 1 inasmuch as the ammonia introduced from line 19b is under pressure and likewise the slurry in line 22 is under pressure from the pump 21. The reaction product, in this case ammonium sulphate, is removed from the tubular reactor at 25 and water vapor is removed through a line 26. As stated hereinabove, the heat of reaction in the tubular reactor 12 produces steam which propels the mixture forwardly and prevents clogging of the reactor provided it has an adequate diameter.

The water vapor removed from the tubular reactor 12 through the line 26 and that removed from the first ammoniator 11 through the line 20 are introduced into the scrubber 13 into which wash water is introduced through a line 27. The resulting wash water contains ammonia dissolved therein, and this ammonia is recovered by introducing it through the line 16 to the acid preparation tank 10. Uncondensed water vapor, air and any other gases that may have accumulated are removed through the line 28 and are joined by vapor from the acid preparation tank from line 17, and the combined gases and vapor are forced by a blower 29 through a line 30 to the atmosphere.

Referring now to Figure 2, there is shown one form of tubular reactor which is shown diagrammatically at 12 in Figure 1. The tubular reactor of Figure 2 is generally designated by the reference numeral 40 and it comprises an elongated tube 41 which is shown as being in horizontal position. However, it may be in vertical or inclined position, although the horizontal is preferred. The tube 41 has a closed inlet end 42 and an open outlet end 43. At its inlet end it is provided with a pressure relief valve 44 which is set to open at a suitable pressure, e.g. 150 to 200 p.s.i. gauge. The purpose of the valve 44 is to relieve excess pressure caused by liquid ammonia. At its inlet end the tube 41 is also provided with a coaxial inlet nozzle 45 having holes 46 for efflux of ammonia.

A metering valve 45a is provided to regulate the delivery of ammonia to the apparatus. The inlet end of the tube 41 is also provided with a lateral inlet pipe 47 to which is connected a gauge 48. It is intended that acid slurry be pumped into the pipe 47, thence into the tube 41 by means of a pump 49 which is connected to the pipe 47 by an orifice 50. The orifice 50 is regulated to control the flow of acid slurry into the tube 41. The pump 49 receives its supply of acid slurry through a pipe 55.

At its outlet end the tube 41 has a downward section 56 which is disposed coaxially within a large chamber 57 having a conical top and bottom, as illustrated. At its upper end the chamber 57 has an outlet duct 58 connected to the chamber by means of a valve 59 and at its lower end it has an opening 60 regulated by a valve or closure member 61.

The length and diameter of the tube 41 will vary depending upon the particular conditions under which it is operated. Lengths of tubing from 10 feet or less to 60 feet or more having, say, a 2 inch inside diameter, more or less, are quite suitable for the purpose. Specifically, a 2 inch inside diameter heavy wall tube 30 feet long has been used to produce 300 pounds per minute of ammonium sulphate.

The chamber 57 is preferably of large volume compared to the volume of the tube 41, e.g., 10 to 20 times the volume of the tube 41. It is employed to absorb pressure surges and as a separator for separating the gases and vapors from the solid product, and from remaining liquid, if any. The gases pass out through the valve 59 and the stack 58 and the solids and any remaining liquid pass out through the bottom opening 60. Back pressure is controlled by means of valve 59, which is preferably regulated to maintain a back pressure of about 10 to 40 pounds. Such a back pressure is advantageous because it absorbs pressure surges which occur when liquid ammonia vaporizes as it comes in contact with the hot solution introduced into the tube 41 by the pump 49. A pressure gauge is employed at 63 which, together with the pressure gauge 48, is used to control operations. With a modicum of experience an operator can learn to use these pressure gauges, particularly the pressure gauge 48, to control operations, especially the rate of ammonia feed, and to estimate the extent, if any, of plugging of the tube 41.

Referring now to Figure 3, a modification of the tubular reactor is there illustrated which is generally indicated as 40a and which comprises a straight length of horizontal tube 41a similar to the tube 41 in Figure 2. However, at its outlet end, instead of being directed downwardly and into a surge chamber such as shown at 57, the tube 41a is formed with an upward extension 70 having an open upper end above which is positioned an adjustable baffle plate 71 against which the emerging mixture of solids, remaining liquid and steam impinge. The solid material together with any remaining liquid contained therein falls by gravity into a bin or basin (not shown) and the vapors are dissipated to the atmosphere. During the falling of the solid and liquid, they will cool.

The water-acid ratio supplied to the tube 41 or 41a is variable, one to two parts by volume of water to one part by volume of acid being the usual range of operation. At a high ratio of 2 parts by volume of water to 1 of acid and a gravity of 40 to 42° Bé., the liquid supplied to the tube 41 or 41a is very fluid and contains relatively little solids, and the end product expelled from the tube will be quite wet. As the ratio is lowered and the gravity is maintained at 40 to 42° Bé., the liquid supplied to the tube 41 or 41a becomes thicker. As a 1 to 1 ratio is approached, the crystal load becomes quite heavy. Among factors influencing the optimum ratio of water to acid are the normal boiling temperature of the mixture and the barometric pressure. In general, by feeding higher acid concentrations and gravities to the tube 41 or 41a, a drier product is produced.

The rate of feed of ammonia can be governed by testing the effluent from the tube 41 or 41a with a suitable indicator, for example, litmus paper. Control of the valve 47 has a very quick response. If the acid content of the effluent falls below about 3% there is likelihood of free ammonia in the effluent vapors and product. The reaction can be carried more nearly to completion by lengthening the tube 41 or 41a. However, it is usually advisable to feed a slight excess of ammonia and to treat the recovered vapors, as shown in Figure 1, to recover ammonia contained therein.

It will, therefore, be apparent that a method and apparatus have been provided which react two reactants, such as an acid and a base, in the desired proportions in an aqueous medium, the proportion of aqueous medium being such that the heat of reaction will suffice to vaporize most or all of the free water; such reaction being carried out in a reactor at a high linear velocity sufficient to carry along the solid reaction product and to expel a mixture of dry or substantially dry reaction product and steam.

I claim:

1. Method for the production of an ammonium salt of a mineral acid in solid form and substantially free from water, which comprises the steps of (1) providing an aqueous solution of a mineral acid having an acid concentration equivalent to at least about 45% to 65% sulfuric acid, (2) reacting said mineral acid with ammonia in concentrated fluid form to produce a hot slurry having an acid concentration equivalent to at least about 18% to 36% sulfuric acid, (3) introducing said hot slurry and additional ammonia in concentrated fluid form continuously, simultaneously, and under pressure into an elongated tubular reactor in proportions and at a rate to yield a substantially neutral solid product directly by reaction of said slurry and fluid ammonia, said tubular reactor having a limited cross-section to provide rapid movement of reactants and reaction product to its outlet end and having a length sufficient for substantially complete reaction and for separation of substantially all of the water present as vapor by the heat of reaction during passage through said reactor and at the time the reaction mixture is expelled from the outlet end of said reactor with release of said pressure, and (4) recovering said ammonium salt in solid form and substantially free from water.

2. The method of claim 1, wherein the mineral acid is sulfuric acid.

3. The method of claim 1, wherein the mineral acid is phosphoric acid.

4. The method of claim 1, wherein the ammonia is introduced in the form of liquid ammonia.

5. The method of claim 1, wherein the mineral acid is a mixture of phosphoric and sulfuric acids.

References Cited in the file of this patent

UNITED STATES PATENTS

| | | |
|---|---|---|
| 1,893,437 | Ober et al. | Jan. 3, 1933 |
| 1,999,026 | Tramm et al. | Apr. 23, 1935 |
| 2,047,393 | Siems | July 14, 1936 |
| 2,618,546 | Davenport | Nov. 18, 1952 |
| 2,618,547 | Davenport et al. | Nov. 18, 1952 |
| 2,680,680 | Coleman | June 8, 1954 |
| 2,755,176 | Pearce et al. | July 17, 1956 |